(12) United States Patent
Bonyadi

(10) Patent No.: US 11,998,878 B2
(45) Date of Patent: Jun. 4, 2024

(54) COMPOSITE HOLLOW FIBER AND RELATED METHODS AND PRODUCTS

(71) Applicant: ENTEGRIS, INC., Billerica, MA (US)

(72) Inventor: Sina Bonyadi, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 103 days.

(21) Appl. No.: 16/817,351

(22) Filed: Mar. 12, 2020

(65) Prior Publication Data

US 2020/0289990 A1 Sep. 17, 2020

Related U.S. Application Data

(60) Provisional application No. 62/818,984, filed on Mar. 15, 2019.

(51) Int. Cl.
| | |
|---|---|
| *B01D 69/10* | (2006.01) |
| *B01D 67/00* | (2006.01) |
| *B01D 69/08* | (2006.01) |
| *B01D 69/12* | (2006.01) |
| *B01D 71/26* | (2006.01) |
| *B01D 71/64* | (2006.01) |

(52) U.S. Cl.
CPC ....... *B01D 69/107* (2022.08); *B01D 67/0016* (2013.01); *B01D 69/08* (2013.01); *B01D 69/12* (2013.01); *B01D 71/261* (2022.08); *B01D 71/641* (2022.08)

(58) Field of Classification Search
CPC ........ B01D 69/02; B01D 69/12; B01D 69/10; B01D 53/228; B01D 71/56; B01D 69/08; B01D 71/68; B01D 71/60; B01D 61/145; B01D 67/0016; B01D 63/02
See application file for complete search history.

(56) References Cited

U.S. PATENT DOCUMENTS

| | | | | |
|---|---|---|---|---|
| 4,579,079 | A | * 4/1986 | Nundy | ...................... B05C 3/12 |
| | | | | 118/405 |
| 4,824,568 | A | 4/1989 | Allegrezza, Jr. | |
| 4,968,733 | A | 11/1990 | Muller | |
| 5,124,428 | A | 6/1992 | Yokelson | |
| 5,156,888 | A | * 10/1992 | Haubs | ................... D06M 15/59 |
| | | | | 427/163.2 |

(Continued)

FOREIGN PATENT DOCUMENTS

| | | |
|---|---|---|
| CN | 201024238 Y | 2/2008 |
| CN | 102397759 B | 5/2014 |

(Continued)

OTHER PUBLICATIONS

Jacomex, "Inert solvent—Definition and Purpose", p. 1, https://www.jacomex.com/inert-solvent/#:~:text=An%20inert%20solvent%20is%20a,reaction%20with%20the%20dissolved%20compound, obtained from Web, Sep. 15, 2022. (Year: 2022).*

(Continued)

*Primary Examiner* — Jonathan M Peo

(57) ABSTRACT

Described are composite hollow fibers filter membranes that include a porous polymeric hollow fiber support and a filter layer; methods of making the composite hollow fibers and using the composite hollow fibers as a filter membrane; methods of making a filter component or filter from the composite hollow fiber; and filter components and filters that contain the composite hollow fibers as filter membranes.

18 Claims, 3 Drawing Sheets

(56) References Cited

U.S. PATENT DOCUMENTS

| | | | |
|---|---|---|---|
| 5,173,191 A * | 12/1992 | Black | B01D 61/025 210/490 |
| 5,234,598 A * | 8/1993 | Tran | B01D 71/56 210/654 |
| 5,444,097 A | 8/1995 | Tkacik | |
| 5,472,607 A | 12/1995 | Mailvaganam | |
| 5,510,421 A * | 4/1996 | Dennison | B01D 71/44 525/190 |
| 5,633,039 A * | 5/1997 | Avrillon | C08G 73/1042 427/337 |
| 5,695,640 A | 12/1997 | Tseng | |
| 5,695,702 A | 12/1997 | Niermeyer | |
| 6,986,428 B2 | 1/2006 | Hester | |
| 8,337,598 B2 * | 12/2012 | Yates | B01D 71/64 96/10 |
| 8,784,664 B2 | 7/2014 | Fislage et al. | |
| 8,967,391 B2 | 3/2015 | Yang | |
| 9,034,189 B2 * | 5/2015 | Ryu | B01D 69/12 210/321.81 |
| 9,227,362 B2 * | 1/2016 | Bator | B29D 28/00 |
| 9,718,031 B2 | 8/2017 | Ma | |
| 2003/0217965 A1 | 11/2003 | Kools | |
| 2003/0232184 A1 | 12/2003 | Morikawa | |
| 2005/0229681 A1 | 10/2005 | Yamaguchi | |
| 2007/0007197 A1 | 1/2007 | Mahendran | |
| 2007/0084788 A1 * | 4/2007 | Moya | B01D 67/0088 210/500.29 |
| 2007/0199892 A1 | 8/2007 | Peinemann | |
| 2008/0197070 A1 * | 8/2008 | Sirkar | B01D 67/009 210/500.27 |
| 2009/0297822 A1 | 12/2009 | Fujimura | |
| 2011/0114553 A1 * | 5/2011 | Teramachi | B01D 69/08 427/244 |
| 2012/0000846 A1 | 1/2012 | Herron | |
| 2012/0067813 A1 | 3/2012 | Lee | |
| 2012/0234745 A1 | 9/2012 | Jerman | |
| 2013/0109262 A1 * | 5/2013 | Zhou | B01D 67/0088 442/118 |
| 2015/0143995 A1 * | 5/2015 | Umehara | B01D 69/125 96/13 |
| 2015/0258499 A1 | 9/2015 | Tkacik | |
| 2016/0089622 A1 | 3/2016 | Takashima | |
| 2016/0256836 A1 * | 9/2016 | Bonyadi | B01D 71/64 |
| 2016/0325229 A1 * | 11/2016 | Zhou | B01D 71/40 |
| 2017/0136420 A1 * | 5/2017 | McCool | C07C 7/14 |
| 2018/0001268 A1 | 1/2018 | Liu et al. | |
| 2018/0333675 A1 * | 11/2018 | Liu | C07C 7/144 |
| 2019/0314767 A1 | 10/2019 | Miki | |

FOREIGN PATENT DOCUMENTS

| | | |
|---|---|---|
| CN | 213556376 U | 6/2021 |
| EP | 1520874 B1 | 12/2011 |
| EP | 2316561 B1 | 3/2013 |
| EP | 3639911 A1 | 4/2020 |
| JP | 62277105 A | 12/1987 |
| JP | 63205108 A | 8/1988 |
| JP | 2009219979 A | 10/2009 |
| JP | 2012187575 A | 10/2012 |
| JP | 2012200635 A | 10/2012 |
| TW | 201811422 A | 4/2018 |
| WO | 2003047734 A1 | 6/2003 |
| WO | 2012154790 A2 | 11/2012 |
| WO | 2016081729 W | 5/2016 |
| WO | 2017007683 W | 1/2017 |

OTHER PUBLICATIONS

Pall Corporation to Debut Advanced Filtration Solutions, Port Washington, NY, Jul. 11, 2017, https://microelectronics.pall.com/en/press-release/debut-advanced-filtration-solutions.html#.

* cited by examiner

COMPOSITE HOLLOW FIBER AND RELATED METHODS AND PRODUCTS

This application claims the benefit of U.S. Application No. 62/818,984 filed on Mar. 15, 2019, which is hereby incorporated by reference in its entirety.

FIELD

The following description relates to composite hollow fibers that are useful as filter membranes and that include a porous polymeric hollow fiber support and a filter layer; to methods of making the composite hollow fiber and using the composite hollow fiber as a filter membrane; to methods of making a filter component or filter from the composite hollow fiber; and to filter components and filters that contain the composite hollow fibers as filter membranes.

BACKGROUND

A major application of filter membranes is to remove unwanted materials from a flow of a useful fluid. Many gaseous and liquid fluids in industry are processed using filters, including environmental air, drinking water, liquid industrial solvents and processing fluids, industrial gases used for manufacturing or processing (e.g., in semiconductor fabrication), and liquids that have medical or pharmaceutical uses. Unwanted materials that are removed from fluids include impurities and contaminants such as particles, microorganisms, and dissolved chemical species. Specific examples of impurity removal applications for filter membranes include their use to remove particles or bacteria from therapeutic solutions in the pharmaceutical industry, to process ultrapure aqueous and organic solvent solutions for use in microelectronics and semiconductor processing, and for air and water purification processes.

To perform a filtration function, a filter product includes a filter membrane that is responsible for removing the unwanted material from the fluid. The filter membrane may, as required, be in the form of a flat sheet, which may be wound (e.g., spirally), or pleated, etc. The filter membrane may alternatively be in the form of hollow fibers. The filter membrane can be contained within a housing that includes an inlet and an outlet, so that fluid that is being filtered enters through the inlet and passes through the filter membrane before passing through the outlet.

Unwanted materials in the fluid are removed from the fluid by being captured by the filter membrane either mechanically or electrostatically, e.g., by a sieving or a "non-sieving" mechanism, or both. A sieving mechanism is a mode of filtration by which a particle is removed from a flow of liquid by retention of the particle at the membrane pore entrance due to mechanical interference of the pore with the particle movement. In this mechanism at least one dimension of the particle size is larger than pore size. A "non-sieving" filtration mechanism is a mode of filtration by which a filter membrane retains a suspended particle or dissolved material contained in a liquid flowing through the filter membrane in a manner that is not exclusively mechanical, e.g., that includes an electrostatic mechanism by which the particle or dissolved material is electrostatically attracted to and retained at the external or internal surface of the filter membrane (depth filtration).

Filter membranes can be constructed of porous polymeric films that have average pore sizes that can be selected based on the expected use of the filter, i.e., the type of filtration to be performed using the filter. Typical pore sizes are in the micron or sub-micron range, such as from about 0.001 micron to about 10 micron. Membranes with average pore size of from about 0.001 to about 0.05 micron are sometimes classified as ultrafilter membranes. Membranes with pore sizes between about 0.05 and 10 microns are sometimes classified as microporous membranes.

For commercial use, a filter membrane should be of a type that can be efficiently manufactured and assembled into a filter product. The membrane must be capable of being efficiently produced, and must have mechanical properties such as strength and flexibility that allow the filter membrane to withstand assembly into the form of a filter cartridge or a filter. In addition to mechanical properties, the membrane should have suitable chemical functionality and microstructure for high performance filtration. In some applications more than one chemical functionality, microstructure, or pore size is required to achieve high filtration performance. Hence composite membranes having at two or multiple chemical functionalities are suitable to serve this purpose.

Various polymers have been identified that can be formed into porous, hollow fiber filter membranes by techniques such thermally induced phase inversion (TIPS) or non-solvent induced phase inversion (NIPS). Also, various techniques and equipment have been developed for assembling hollow fiber filter membranes into a final filter product, within a housing. See, e.g., WO 2017/007683 and U.S. Pat. No. 5,695,702, the entireties of these documents being incorporated herein by reference.

For commercial use, a filter membrane must also exhibit efficient and reliable filtering functionality, e.g., must be capable of efficiently removing a high amount of impurities from a continuous flow of fluid that passes through the filter membrane. Filtering performance is normally assessed by two parameters including flux and retention. Flux assesses the rate of fluid flow through a filter or filter membrane, and must be sufficiently high to reflect that a high level of flow through the filter is possible, hence the filter is economically viable. Retention, generally, refers to the amount (in percent) of impurities removed from a flow of fluid through a filter and is an indication of filter efficiency. Membrane flux and retention both significantly depend on the membrane microstructure and pore size, which is commonly measured by bubble point. A membrane with smaller pores, has a higher bubble point and a better sieving retention capability at the expense of lower flux (assuming the same membrane morphology and thickness); a larger pore size corresponds to a lower bubble point and a lower sieving retention but a higher flux assuming the same membrane morphology and thickness. The non-sieving retention capability of a membrane is a more complex property which depends on membrane surface properties (such as charge) in addition to membrane microstructure and pore size.

One area of major commercial interest for membrane filtration is the contamination removal from photoresist solutions in the semiconductor industry. As the semiconductor industry moves towards smaller nodes, the contamination issue becomes more severe as smaller contaminants could cause defects in the wafer product and significantly lower the production yield. The contaminants in the photoresist fluids could include gels, ions or nanoparticles with organic or inorganic nature. Between the two common geometries for membranes, hollow fiber membranes are of particular interest for contamination removal applications as the outside-in flow configuration of hollow fiber devices potentially provides faster flush-up time compared with the devices made from flat sheet membranes. Flush-up time is the time required for particle counts in the liquid passed through the filter reach the base line. The potentially better flush-up time of hollow fiber devices is because the lumen side of the hollow fiber is not exposed to the environment contaminates such as dust and particles during membrane processing, handling and device fabrication, hence more likely to be cleaner. Better device integrity is another potential advantage of hollow fiber devices compared with pleated flat sheet cartridges as that pleating operation could create defects on or near the membrane pleat tip especially when the membrane material is a brittle polymer.

Due to the nature of organic solvents such as cyclohexanone, n-butyl acetate, PGME, and PGMEA used in the photolithography application, the chemical compatibility of a membrane with these solvents is a limiting factor in membrane material selection for these uses. As a result, solvent compatible polymers including polyethylene and nylon have been considered for preparing hollow membranes used in this application. However, there are major limitations associated with these membranes for use to meet the highly demanding requirements of contamination removal in the semiconductor industry. The pore size of the polyethylene hollow fiber membranes, which are made by the TIPS process, is normally limited to pore sizes larger than 40 nm. This limitation is partly due to the nature of the polyethylene solution phase separation and partly due to the process limitation to cool the extruded fiber quickly. For similar reasons, the achievable degree of asymmetry in the microstructure of the TIPS processed membranes is normally lower than the NIPS processable membranes. As a result, TIPS processed membranes normally have inferior flux-bubble point balance compared with the NIPS processed membranes. In addition, the non-polar nature of polyethylene polymer results in limited non-sieving (polar) retention capability of polyethylene compared with highly polar polymers such as nylon. Unlike polyethylene, nylon membranes have very strong non-sieving retention due to polar and electrostatic properties of nylon, and these membranes are processable by both NIPS and TIPS processes. However, the slow phase-separating nature of nylon in the NIPS process makes it difficult to make high BP (small pore size) membranes with good flux. On the other hand, the TIPS processing of nylon has similar limitations of the TIPS processed polyethylene membrane. Overall, there is a need for improved filtration membranes that satisfy solvent compatibility, high retention, and good flux criteria.

SUMMARY

The following description relates to novel composite hollow fiber membranes with high efficiency in contamination removal from photoresist solutions in the semiconductor manufacturing process, and a process to make such composite hollow fibers. The membranes uniquely combine desired sieving properties with strong non-sieving (such as electrostatic, affinity, phobic) properties to achieve high particle retention and high flux. The invented composite hollow fiber also has good mechanical properties for handling, device manufacture, and pressure driven applications.

Fabrication of composite membranes is a useful approach to tailor the properties of a membrane to achieve high flux, high retention, good mechanical properties and reasonable cost. For example, a combination of high flux, high retention, and good mechanical properties can be achieved by making a composite membrane having a thin layer with small pore size (tight layer) on a thicker layer with larger pore size (support layer). In this configuration the high flow resistance of the tight layer is minimized by reducing its thickness while the required membrane mechanical strength is achieved by using a thicker support layer with minimal flow resistance due to bigger pore size. Sometimes composite membrane concepts can be used to lower the cost of membranes made from expensive polymers by fabricating a thin layer of a functional expensive polymer on a thicker support layer. Another useful application of composite membranes is where layers with different functionalities are required within one membrane to carry out the desired separation.

The development of some types of composite hollow fibers has been reported. Early developments of such membranes were targeted for gas separation applications by coating a dense polymer layer on an outer surface of a microporous hollow fiber support. The process for fabrication of such membranes involved coating the outer surface of a microporous hollow fiber with a polymer solution followed by an annealing step to vaporize the solvent from the coated solution and create a dense nonporous layer on the external surface of the hollow fiber. Another example of a method of fabricating a composite membrane involves co-spinning two different polymer solution using a dual orifice spinneret into a coagulation bath two form a dual layer membrane. The major limitation of this method is the difficulty to tailor the properties of each layer independently as the phase separation of one layer affects the rate of phase separation of the other layer, hence its properties. Also, it is sometimes impossible or very complicated to make a dual layer hollow fiber membrane with one layer out of a NIPS processable polymer and another layer out of a TIPS processable one. For example, to make a polyethylene (PE)-polyethersulfone (PESU) composite hollow fiber by this method, the high temperature (around 150 C) of the polyethylene solution required for TIPS processing increases the spinneret temperature and subsequently the processing temperature of the PESU solution. This could negatively affect the phase separation of polyethersulfone layer as PES polymer solution tends to phase separate at high temperatures. Therefore, the PES solution may phase separate inside the spinneret before entering the coagulation bath. This phenomenon could hinder the optimal control of the PES layer properties.

Applicant has now discovered novel hollow fiber filter membrane constructions that can exhibit useful or advantageous filtering performance properties, including high flux combined with relatively high bubble point (small pore size) and good retention. The performance compares well or shows substantial improvement relative to previous and current commercial hollow fiber filter membrane products.

As described herein, hollow fiber filter membranes are made in composite form. The composite includes a porous, polymeric hollow fiber support, with a porous filter layer disposed on the hollow fiber support. The hollow fiber support functions as a support structure on which the filter layer is positioned. The hollow fiber support may also be capable of functioning as a filter, but is not required to function as a filter to remove unwanted material from a flow of liquid that is passed through the composite hollow fiber membrane. Depending on the type and size of unwanted material (contaminant) being removed from a fluid that passes through the composite filter membrane, and depending on the physical properties (e.g., pore size) and chemical makeup of the hollow fiber support, the hollow fiber support may be effective to remove unwanted material either by a sieving or a non-sieving mechanism. Alternatively, the hollow fiber support is not required to provide a substantial filtering effect, and a majority of the filtering performance of the composite may be provided by the filter layer.

The filter layer is porous, and performs a function of filtering, i.e., removing unwanted material from, a flow of liquid that is passed through the composite hollow fiber membrane. The filter layer can preferably be in the form of a thin, porous layer of filter layer polymer that is located on an exterior side of the hollow fiber support. The porous hollow fiber support includes a matrix of pores that extend through a thickness of the hollow fiber support. The composite, therefore, includes a layer of the hollow fiber support, and the filter layer.

In certain embodiments, the hollow fiber support may have pores that are relatively larger than pores of the filter layer, and may be relatively thicker than the filter layer. In these example composites, the relatively larger pore size of the larger (thicker) hollow fiber support causes a reduced level of resistance of flow through the hollow fiber support (and greater flow with a lower flow time) relative to a comparable support that would have smaller pores. The filter layer, which is thinner but has a relatively smaller pore size, is highly effective as a filter, to remove unwanted material from a fluid flow, but because it is relatively thin, still allows for a useful or advantageously high volume of flow through the composite.

The filter layer is made of polymer (referred to as "filter layer polymer") that is solution processable, meaning that the filter layer polymer can be dissolved in solvent to form a polymer solution that can be used to coat the filter layer polymer onto the hollow fiber support. By one example, a layer of polymer solution that contains filter layer polymer dissolved in solvent can be coated as a layer of coated polymer solution onto outer portions of a hollow fiber support; subsequently, the coated polymer solution can be exposed to a non-solvent (meaning a liquid in which the dissolved filter layer polymer is substantially insoluble), and the filter layer polymer will precipitate (e.g., coagulate) to form a layer of precipitated (coagulated) filter layer polymer on the outer surface of the hollow fiber support.

The filter membrane may be used to filter (i.e., remove material from) a liquid that must be used at a high purity level in a commercial or industrial process. The process may be any that requires a high purity liquid material as an input, with non-limiting examples of such processes including processes of preparing microelectronic or semiconductor devices, a specific example of which is a method of filtering a liquid process material (e.g., solvent or solvent-containing liquid) used for semiconductor photolithography or cleaning and etching processes. Examples of contaminants present in a process liquid or solvent used for preparing microelectronic or semiconductor devices may include metal ions dissolved in the liquid, solid particulates suspended in the liquid, and gelled or coagulated materials (e.g., generated during photolithography) present in the liquid.

In one aspect, a composite hollow fiber filter membrane that includes: a polymeric, microporous, hollow fiber support having an outer surface, an inner surface, a thickness extending between the outer surface and the inner surface, and micropores; and a porous polymeric filter layer comprising coagulated polymer contacting the outer surface. In some embodiments, the porous polymeric filter layer penetrates not more than partially into the thickness of the hollow fiber support. In other embodiments, the porous polymeric filter layer penetrates substantially into the thickness of the hollow fiber support.

Another aspect relates to a method of preparing a composite hollow fiber filter membrane comprising a hollow fiber support and a porous polymeric filter layer. The method includes: placing a polymer solution coating on an outer surface of a polymeric, microporous, hollow fiber support, the polymer solution comprising polymer dissolved in solvent; and contacting the polymer solution coating with coagulation solution to cause dissolved polymer of the polymer solution coating to form a layer of coagulated polymer on the outer surface, the layer of coagulated polymer contacting the outer surface and penetrating not more than partially into a thickness of the hollow fiber support.

Yet another aspect relates to a filter that includes a composite hollow fiber filter membrane comprising: a polymeric, microporous, hollow fiber support having an outer surface, an inner surface, a thickness extending between the outer surface and the inner surface, and micropores; and a porous polymeric filter layer comprising coagulated polymer contacting the outer surface and penetrating not more than partially into the thickness of the hollow fiber support.

Figure 1:
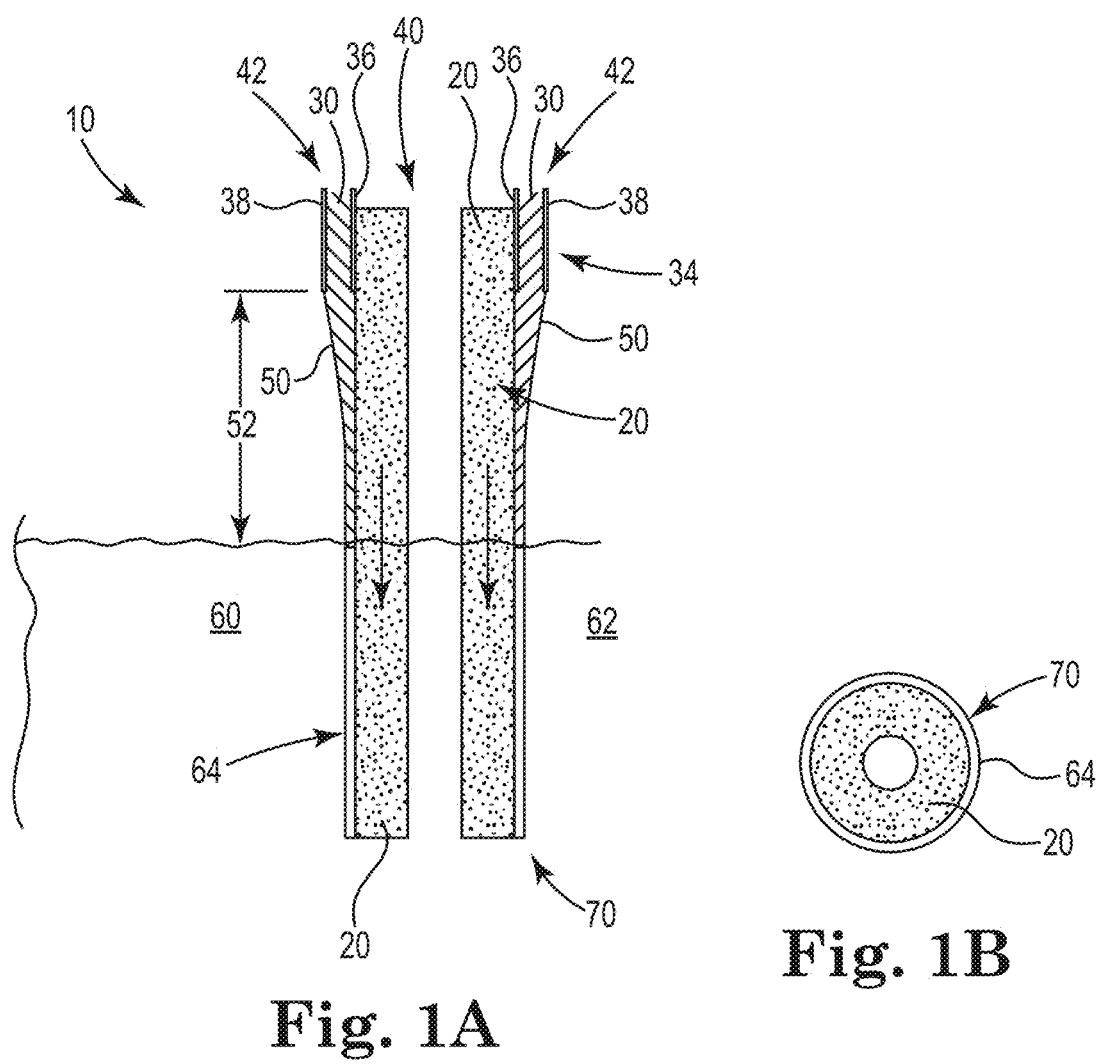
FIG. 1A shows a schematic diagram of a system for coating a filter layer of the invention onto a hollow fiber support to produce a composite as described.
FIG. 1B shows a schematic cross-sectional view of a composite hollow fiber as described.

The figures are schematic and are not necessarily to scale.

DETAILED DESCRIPTION

Applicant has identified novel composite hollow fiber filter membranes and methods for preparing composite hollow fiber filter membranes (also sometimes referred to herein as "composite membranes," "composite filter membranes," "composite," or the like). The composite filter membranes include a hollow fiber support and a filter layer disposed on the hollow fiber support. The hollow fiber support may perform a sieving or a non-sieving filtration function, while performing the function of mechanically supporting the composite during use and providing a location for the filter layer within a hollow fiber filter cartridge or a hollow fiber filter membrane. The hollow fiber support is not required to function as a filtering component of the composite, but can provide useful support and useful physical and mechanical properties to the composite, and good flow properties, to allow fluid to flow through the support and through the filter layer during use of the composite as a filter. The filter layer performs the function of filtering (i.e., removing unwanted material from) a flow of fluid that is passed through the composite filter membrane. The composite can exhibit a useful or advantageous combination of flow properties and filtering performance.

The hollow fiber support (also referred to herein as simply the "support") is a polymeric hollow fiber material that is porous, and that can effectively support the filter layer so that fluid can be passed through the filter layer, e.g., when the composite hollow fiber filter membrane is included in a filter cartridge or a filter. The hollow fiber support is polymeric, porous, and sufficiently rigid yet flexible to allow for its use as a supportive component of a composite hollow fiber membrane as described. The support has features such as porosity, pore size, thickness, and composition (i.e., polymeric makeup), that together contribute to the properties of the support. The support should be sufficiently porous, and with suitable pore size, to allow for liquid fluid to pass through the support at a flow rate that is sufficient for the composite filter membrane to be used in a commercial filtering application. In certain embodiments of the composite, in addition to functioning as a support, the hollow fiber support can also be effective as a filter to remove unwanted material from a flow of fluid either by a sieving or a non-sieving filtering mechanism. In these example composites, the physical properties (e.g., pore size, thickness) and the chemical composition of the hollow fiber support, or both, can be effective for filtration by a sieving mechanism, a non-sieving mechanism, or both.

A hollow fiber support can have any porosity that will allow the porous support to be effective as described herein, to allow a suitable flow rate of liquid to pass through the support and through a filter layer situated on the support, and if desired to allow the hollow fiber support to perform a filtering function by a sieving or a non-sieving filtering mechanism. Examples of useful hollow fiber supports can have a porosity of up to 90 percent, e.g., a porosity in a range from 60 to 90, e.g., 65 to 80 percent. As used herein, and in the art of porous bodies, a "porosity" of a porous body (also sometimes referred to as "void fraction") is a measure of the void (i.e. "empty") space in the body as a percent of the total volume of the body, and is calculated as a fraction of the volume of voids of the body over the total volume of the body. A body that has zero percent porosity is completely solid.

The size of the pores of the hollow fiber support (i.e., the average size of pores throughout the hollow fiber support) can be of a size that, in combination with the porosity, thickness, and inner and outer diameter dimensions, provides for desired flow of liquid fluid through the hollow fiber support, provides a porous surface to which the polymer filter layer can be adhered, and if desired allows the hollow fiber support to perform a filtering function by a sieving or a non-sieving filtering mechanism.

A pore size that will be useful for a particular hollow fiber support, e.g., in a specific composite membrane, can depend on factors such as: the thickness of the hollow fiber support; the thickness, porosity, composition, and pore size of the filter layer; the degree to which the hollow fiber support will perform as a filter to remove unwanted materials from a flow of fluid; the desired flow properties and filtering properties of the composite; and features of the method by which the filter layer is deposited (e.g., coated) onto the hollow fiber support including viscoelastic properties of the coated polymer solution. For certain presently understood examples of immersion coating methods useful (as described herein) to place a filter layer on a hollow fiber support, example pore sizes of a hollow fiber support may be in a range from about 30 nanometers, 50 nanometers, 0.05 microns, up to 10 microns, e.g., of sizes sometimes classified as "microporous," "ultraporous," or "nanoporous." For purposes of the present description, the term "microporous" is sometimes used to refer to pores within any of these size ranges, including microporous and sub-microporous sizes, as a way of distinguishing from materials having larger pore sizes, i.e., to distinguish over materials that are considered to be "macroporous." Examples of average pore sizes of a hollow fiber support may be at least 30 nanometers, at least 50 nanometers, or at least 0.1 or 0.5 microns, and up to about 4, 6, 8, or 10 microns.

During coating of the polymer solution onto the support, a specific degree of penetration may be desired. The degree of penetration may be any that is useful, either a high or a low degree of penetration. If a pore size of the support is large, a polymer solution applied to the support (for placing the filter layer) will tend to penetrate into the pores of the support to a relatively greater depth (as compared to penetration into a support with smaller pore size), potentially a depth that is either not necessary or not desired. If pore size of the support is too small, the pores can become closed, clogged, blocked, or filled, by the polymer solution in a manner that would unacceptably inhibit or prevent flow of liquid through some or all of the pores during use, producing a substantial reduction in the ability of a liquid to flow through the hollow fiber support during use as a component of a composite filter membrane, e.g., can undesirably and unacceptably reduce flux. Based at least on differences in pore size, a tubular braided hollow membrane, e.g., of the type described in U.S. Pat. No. 5,472,607, may be unsuitable or non-preferred as a hollow fiber support for use in a composite hollow fiber membrane as described.

A hollow fiber support can have thickness, inner diameter, and outer diameter dimensions that are effective for the support to function as a support component of a composite filter membrane as described. Examples of useful wall thicknesses of a hollow fiber support may be in a range from 25 to 250 microns, e.g., from 30 to 150 or 200 microns. Examples of useful inner diameters of a hollow fiber support may be in a range from 300 to 1000 microns, e.g., from 400 to 700 or 900 microns. Examples of useful outer diameters of a hollow fiber support may be in a range from 500 to 1500 microns, e.g., from 600 to 1200 or 1300 microns.

A hollow fiber support may be made of any polymer that is useful to form a hollow fiber for use as a composite filter membrane as described herein. The support should be chemically resistant to (e.g., not chemically degraded by) liquids that will be passed through the support when used as a component of a composite filter membrane in a filtering step. Useful examples include polymers that have been used or that are found to be useful as hollow fiber filter membranes for filtering fluids used in semiconductor and microelectronic processing (e.g., solvent or process fluids), examples of which are known and include fluoropolymers (e.g., Teflon™), polyethylene, polypropylene, nylons that are compatible with photolithography solvents used in semiconductor fabrication. If the expected us of the filter membrane is in the semiconductor dilute wet etch and clean process, the choice of hollow fiber support may be a fluoropolymer or a sulfone polymer hollow fibers such as Teflon. These examples contemplate homopolymers and co-polymers of polyolefins such as polypropylene and polyethylene, particularly ultrahigh molecular weight polyethylene (UPE), nylons (e.g., polyamides), and other known polymer materials. The hollow fiber support polymer can preferably (but not necessarily) be compatible with a solvent used for processing the filter coating layer, examples of which include NMP, DMF, DMAc and Acetone. Fluoropolymers such as Teflon, polyethylene, polypropylene and nylon are examples of such polymers.

For a hollow fiber support that will be used and effective for filtering by a non-sieving method, certain polymers can be useful or preferred. Examples of polymers that may be useful as part of a filter membrane, for non-sieving filtering functionality, include polyamides (e.g., nylons); polyimides; polyamide-polyimides; surface treated versions of polyamides, polyimides, or polyamide-polyimides. A desired polymer may be selected base on the type of contaminant that is being removed. For example, nylon polymer may be effective to remove organic gels or dissolved metal contaminants from an organic solvent. A polymer that includes anionic (negatively charged) surface groups may be effective to remove cationically (positively) charged contaminants that are dissolved or suspended in a liquid.

In certain examples, a hollow fiber support can be made of ultrahigh molecular weight polyethylene ("UPE"), which is generally understood to mean polyethylene polymer having a molecular weight of at least 1,000,000 Daltons. The term "polyethylene" refers to a polymer that has, in part or substantially, a linear molecular structure of repeating —$CH_2$—$CH_2$— units. Polyethylene can be made by reacting monomer composition that includes monomers that comprise, consist of, or consist essentially of ethylene monomers. Thus, a polyethylene polymer may be a polyethylene homopolymer prepared by reacting monomers that consist of or consist essentially of ethylene monomers. Alternatively, a polyethylene polymer may be a polyethylene copolymer prepared by reacting a combination of ethylene and non-ethylene monomers that include, consist of, or consist essentially of ethylene monomers in combination with another type of monomer such as another alpha-olefin monomer, e.g., butene, hexene, or octane, or a combination of these; for a polyethylene copolymer, the amount of ethylene monomer used to produce the copolymer, relative to non-ethylene monomers, can be any useful amount, such as an amount of at least 50, 60, 70, 80, or 90 percent (by weight) ethylene monomer per total weight of all monomers (ethylene monomer and non-ethylene monomer) in a monomer composition used to prepare the ethylene copolymer.

As used herein, a composition that is said to "consist essentially of" a specified composition, ingredient, or a specified combination of ingredients, means a composition that contains the specified composition, ingredient, or a specified combination of ingredients and not more than an insubstantial amount of other ingredients, e.g., not more than 3, 2, 1, 0.5, or 0.1 weight percent of any other materials. Monomers that consist essentially of ethylene monomers refers to a composition that contains ethylene monomer and not more than 3, 2, 1, 0.5, or 0.1 weight percent of any other monomers, based on total weight of all monomers in the composition. Monomers that consist essentially of ethylene and alpha-olefin monomers refers to a composition that contains ethylene and alpha-olefin monomers and not more than 3, 2, 1, 0.5, or 0.1 weight percent of any other monomers, based on total weight of all monomers in the composition.

The hollow fiber support maybe prepared in any known or future useful fashion to produce a hollow fiber support having properties as described. Examples of known methods for preparing hollow fiber thermally induced phase separation (TIPS) and immersion precipitation methods (also called non-solvent induced phase separation of NIPS).

The composite hollow fiber filter membrane includes a filter layer provided on the hollow fiber support at a location and in an amount that allow for the filter layer to function as a filter to remove unwanted material from a flow of fluid that passes through the composite. The filter layer is porous, relatively thin compared to the thickness dimension of the hollow fiber support, and is preferably coated onto an outer porous surface of the hollow fiber support in a manner that mechanically secures the filter layer to the outer porous surface without substantially or unduly covering, blocking, or filling pores of the outer porous surface.

The composition and the physical features (such as porosity and pore size) of the filter layer are independent from the composition and physical features of the hollow fiber support. The primary function of the filter layer is to filter (i.e., remove unwanted material from) a liquid fluid as the liquid fluid flows through the filter layer. To perform this function, the filter layer should be situated at a location to allow liquid to flow through the filter layer while flowing through the support. For example the filter layer can be positioned at an outer porous surface of the support. The filter layer should be evenly distributed over the outer porous surface and should be distributed over substantially the entire area of the outer porous surface, to be effective as a filter. The filter layer can have of any thickness, porosity, and pore size (average) that will be useful to effectively perform the filtering function by a sieving mechanism, a non-sieving mechanism, or both. Generally, a filter layer can have a substantially smaller thickness relative to the support (i.e., the filter layer is substantially thinner than the support). In various example embodiments, a filter layer may have a smaller pore size relative to the pore size of a support, or may have a pore size that is about the same as or larger than the pore size of the support.

An example filter layer can have any porosity that will allow the filter layer to be effective as a filter layer. Examples of useful filter layers can have a porosity of up to 90 percent, e.g., a porosity in a range from 60 to 85, e.g., 65 to 80 percent.

The size of the pores of the filter layer (i.e., the average size of pores throughout the filter layer) can, in combination with the porosity, thickness, and composition of the filter layer, be any size that is effective to provide for a useful or advantageous level of filtering functionality (e.g., as measured by retention) when liquid is passed through the composite filter membrane, while also allowing for a rate of flow of the fluid through the filter layer (and composite filter membrane) that is sufficiently high for the composite filter membrane to be commercially useful.

In particular embodiments of a composite as described, a filter layer can have smaller pores relative to the hollow fiber support. According to these embodiments, the resistance to flow of fluid though the filter layer will be greater (per thickness) than the resistance to fluid flow through the larger-pore-sized support (per thickness). Preferred such example composites may also include a thicker hollow fiber support with good flow properties, and the relatively thinner filter layer with good filtering properties to produce a composite that exhibits an advantageous combination of good flow properties through the composite along with highly useful or advantageously high filtering performance provided by the relatively thin filter layer. The composite also has useful mechanical properties including desired levels of flexibility and rigidity, with the filter layer being effectively secured to the support, and both the support and the filter layer being not excessively brittle or breakable.

A useful pore size for a filter layer can depend on factors such as: the thickness, porosity, and composition of the filter layer; the desired flow properties and filtering performance properties (e.g., retention) of the composite filter membrane; and features of the method by which the filter layer is deposited (e.g., coated) onto the hollow fiber support. For certain presently useful examples of placing a filter layer on a hollow fiber support by immersion coating, example pore sizes of a filter layer may be from at least 1 nanometer, e.g., at least 10, 30, or 50 nanometers, or 0.05 microns, up to 2, 4, 6, or 8 microns.

A filter layer can have thickness that will result in effective filtering and flow performance as described herein. Additionally, the thickness of the filter layer should result in the filter layer penetrating into and contacting internal surfaces of the porous hollow fiber support to mechanically secure the filter layer to the hollow fiber support. The filter layer can partially or fully penetrate into the hollow fiber support to thereby become mechanically adhered and well-anchored to the support, without causing a substantial amount of clogging or filling of the pores of the hollow fiber support. Examples of useful thicknesses of a filter layer may be in a range from 5 to 40 microns, e.g., from 10 to 20 microns (not including the distance to which the filter layer penetrates into the support). Examples of the distance to which the filter layer penetrates into the thickness of the hollow fiber support can be less than 2 microns or less than 1 micron, although distances greater than these can also be useful, potentially including a filter layer that penetrates completely into the support layer.

To be effective for filtering a liquid, the filter layer can be made of a polymer (a "filter layer polymer") that is resistant to solvents and other chemical materials that will be present in a liquid that will be processed using the filter layer. Filter layer polymers that are presently understood to be useful according to the present description include those that are chemically resistant to (e.g., not chemically degraded by) liquids used in semiconductor and microelectronic processing (e.g., solvent or process fluids). Examples may generally include polymers that are useful (at present or in the future) for preparing hollow fiber filter membranes used for filtering fluids for semiconductor and microelectronic processing (e.g., solvent or process fluids), with specific examples including polyimides, polyamides, polyamide-imides, polysulfone family polymers e.g., homopolymers and co-polymers of polyimides, polyamides, polysulfone, polyethersulfone, and polyphenylsulfone.

Polyamides are a class of well-known polymers that include nylons. Polyamides are chemically considered to be polymers that include multiple repeating carbon-carbon organic polymeric backbone units separated by repeating amide linkages. Polyamides can be prepared by reacting monomers or reactive ingredients that include functional groups capable of combining to form a polymer backbone having repeating amide linkages. Examples of a combination of monomers useful to prepare polyamides include di-amine monomers and di-carboxylic acid monomers. Example polyamides include copolymers and terpolymers prepared by polymerizing a combination of two or three diamine and dicarboxylic acid monomers. Certain presently-preferred polyamides include nylons such as Nylon 6 and Nylon 6,6.

Polyimide (sometimes abbreviated PI) is a polymer that includes imide linkages in a carbon-carbon polymer backbone. Polyimide polymers may be "pure" polyimides that contain imide linkages but no ester or amide linkages, or may alternately contain other non-carbon-carbon linkages such as ester linkages or amide linkages. Certain presently-preferred polyamides include those referred to as P84 and Matrimid polyimides.

Polyamide-polyimide polymers (sometimes abbreviated as PAI) include amide and imide linkages. Some specific examples of polyamide-imide polymers include those prepared from an aromatic diamine and aromatic acid chloride anhydride (acid chloride route), while others may be prepared from aromatic diisocyanate and anhydride (diisocyanate route). Example of commercial polyamide-imides are polymers sold by Solvay Specialty Polymers, under the trademark Torlon.

Some polyimide or polyamide polymers may be mechanically brittle or inflexible if included in a filter membrane (or other structure) at a relatively high thickness, e.g., if the polymer were used by itself to form an entire thickness of a hollow fiber membrane. Some polyimides, if used alone to form an entire thickness of a porous hollow fiber membrane, e.g., of a thickness up to or greater than 30 or 50 microns in thickness, will tend to be mechanically brittle or fragile to an extent that would prevent the hollow fiber membrane from being commercially useful. As determined by Applicant, however, thinner layers these of these polymers, such as in the form of a thin filter layer of a composite membrane, as described, can exhibit mechanical properties (including flexibility and reduced brittleness) that allow the polymers to be placed onto a support and processed and formed into a filter, and used as a filter, without being mechanically unsuitable.

For processability, a preferred filter layer polymer can be one that is capable of being effectively (and preferably efficiently) placed by a useful coating method on an outer porous surface of a support as described. Preferred filter layer polymers are capable of being dissolved in solvent to form a polymer solution that can be coated onto a porous outer surface of a hollow fiber support and then precipitated from the polymer solution onto surfaces of the outer porous surface to form an effective filter layer as described. Presently useful and preferred filter layer polymers can be dissolved in solvent to form a polymer solution that can be coated onto an outer porous surface of a hollow fiber membrane using an annular die, then coagulated by an immersion precipitation method to form a useful filter layer. The amount (e.g., thickness) and placement of the filter layer can be sufficient to allow the filter layer to show highly effective filtering performance (e.g., as measured by retention) as the filter layer of a composite hollow fiber filter membrane, while still allowing for a desirably high level of flow of liquid through a composite hollow fiber filter membrane as described.

A useful filter layer polymer can be provided as a coating on the porous polymeric film coating by any useful coating technique, such as by precipitation coating, preferably from a polymer solution in which the filter layer polymer is dissolved in solvent. Preferred filter layer polymer is, therefore, solvent processable and capable of being dissolved in solvent for coating onto a support such as a hollow fiber support. The solvent may be any useful solvent, with examples including NMP (n-methyl pyrrolidone), DMF (N,N-dimethylformamide), and N,N-dimethylacetamide (DMAC). The solvent may preferably contain no water or not more than a low amount of water, such as not more than about 2, 1, or 0.5 weight percent water. The polymer solution may also contain a non-solvent such selected from non-limiting examples that include an alcohol, an acid, an ether, etc. Also, in addition to optional nonsolvent, the polymer solution may contain other additives such pore forming agents such as polyvinylpyrrolidone (PVP), polyethylene glycol (PEG), etc.

The polymer solution may contain any effective amount of solvent and dissolved filter layer polymer. Example polymer solutions may contain any effective amount of filter layer polymer, such as an amount in a range from 5 to 30 percent by weight, e.g., from 10 to 20 (or 25) weight percent filter layer polymer with the balance being solvent (e.g., organic solvent as described herein optionally in combination with non-solvent and pore forming agent).

The filter layer polymer may be but is not necessarily, and is not required to be, curable or reactive with itself, such as to be crosslinked. As a result, the polymer solution that contains the filter layer polymer dissolved in solvent is not required to contain, and may optionally exclude (e.g., contain less than 0.05, 0.01, or 0.005 weight percent) any chemical ingredient that is useful to produce a curing reaction of the coated filter polymer, such as a crosslinker, catalyst, or initiator.

The composite hollow fiber filter membrane includes the hollow fiber support and the filter layer. While additional layers or materials may optionally be included, the described composite does not require and may in certain embodiments preferably exclude other layers, coatings, or materials. For example, certain example composite membranes of the present description do not require and may preferably exclude an intermediate coating or layer that would be located between the porous support and the filter layer, such as a primer layer or coating disposed on the outer porous surface of the support for the purpose of improving adhesion of the filter layer to the support. In such embodiments the filter layer can be disposed directly onto the outer porous surface of the support.

In an example of a presently-preferred method for preparing a hollow fiber composite as described, a filter layer may be formed onto a hollow fiber support by forming a polymer solution that contains the filter layer polymer and placing the filter layer polymer on an outer porous surface of the hollow fiber support by an immersion precipitation or thermally-induced phase inversion coating technique. By immersion precipitation, generally, polymer solution that contains dissolved polymer in solvent is cast on a supporting layer and then submerged in a coagulation bath that contains "nonsolvent," meaning a liquid in which the polymer is not substantially soluble. Due to the solvent and nonsolvent exchange, the polymer precipitates from the polymer solution onto the supporting layer. The polymer must be highly soluble in the solvent of the polymer solution and substantially insoluble in the "non-solvent" so that the polymer precipitates or coagulates upon contact with the non-solvent (e.g., aqueous liquid) of the coagulation bath.

In some embodiments for preparing a hollow fiber composite as described, filter polymer can be dissolved in solvent to form a polymer solution that can be applied to an outer porous surface of a hollow fiber support by an immersion precipitation method. A general method includes one or more steps that include: forming or otherwise providing a polymer solution that includes the filter layer polymer; applying the polymer solution to an outer porous surface of the hollow fiber support; causing the filter layer polymer of the polymer solution to precipitate (e.g., coagulate) out of solution and onto the outer porous surface of the hollow fiber support; and drying the precipitated filter layer polymer to form a composite that includes the filter layer coated on the outer porous surface of the hollow fiber support.

An example of such a method can include the use of an annular die to guide and support the un-coated hollow fiber support, moving through the annular die, while polymer solution passes through the annular die and onto an outer porous surface of the hollow fiber support. An annular die includes an inner cylindrical support and an outer cylindrical support, aligned concentrically to form an annular opening having a substantially uniform size (width) between an outer surface of the inner cylindrical support and an inner surface of the outer cylindrical support. The inner cylindrical support also defines a circular opening that is sized to contain and guide movement of the hollow fiber support. As the hollow fiber support is being passed through the annular die (e.g., pulled through the die in a vertically downward direction) a flow of polymer solution is passed through the annular opening to become coated onto an outer surface of the hollow fiber support. The diameter of the circular opening is sufficient for a desired fit of the hollow fiber support within the circular opening, e.g., to allow the hollow fiber support to pass through the circular opening at a desired speed. The size (width) of the annular opening can be effective to place a coating of the polymer solution, having a desired thickness, onto the outer surface of the hollow fiber support as the support passes through the circular opening.

Any effective coating equipment, conditions and processing parameters may be used, including, for example, the draw speed of the support, the flow rate of polymer solution, and the relative size of the annular die compared to the support diameter. The flow rate of the polymer solution and the speed of the hollow fiber support passing through a die may determine the thickness of the coating filter layer.

According to certain examples of this type of coating technique, the coated polymer solution (placed onto the hollow fiber support by the annular die) may optionally be exposed to air after the coating step (after passing through the annular die) and before the polymer is contacted with the non-solvent of the coagulation bath. Exposure to air after coating and before entering the coagulation bath is not necessary, but can allow partial drying of the coated polymer before contact with the coagulation bath. While not necessary or required, exposure to air before the coagulation bath may be useful to obtain more penetration of the coated polymer layer into the hollow fiber support to achieve better mechanical interlock between the support and the coated layer. If the air-gap is too large, however, the penetration may be too great and the membrane flux could be negatively affected. Alternately, the air-gap may be useful to achieve a particular microstructure in the coated layer by evaporation of solvent during exposure to air, which may result in some degree of some phase separation. If an air-gap is present, the amount of time to which the coated polymer solution is exposed to air before being contacted with the non-solvent can be as desired, e.g., less than 2 seconds, less than 1 second, or less than 0.5 second.

Referring to FIG. 1A, illustrated is a portion of an immersion coating system that is effective for preparing an example composite hollow fiber 70 as described. FIG. 1B shows a cross-sectional view of composite hollow fiber 70.

System 10 includes hollow fiber support 20, polymer solution 30, and annular die 34. A source (not shown) of hollow fiber support 20, such as a spool or bobbin wound with a continuous length of hollow fiber support 20, is located to allow hollow fiber support 20 to be supplied to system 10. One or more rollers (also not shown) can be used to guide hollow fiber support 20 to and through the different components and locations of system 10.

Polymer solution 30 is supplied to annular die 34, which includes inner cylindrical support 36, outer cylindrical support 38, circular opening 40 (defined by an inner surface of inner cylindrical support 36), and annular opening 42 (between inner cylindrical support 36 and outer cylindrical support 38). Hollow fiber support 20 is threaded through circular opening 40 and is advanced through circular opening 40 (in a downward direction in FIG. 1A) while a flow of polymer solution 30 is dispensed through annular opening 42. A syringe or a pump (not shown) causes polymer solution 30 to flow at a steady rate from a bottom of annular opening 42, under a desired level of pressure and flow, to place a continuous and substantially uniform coating of polymer coating 50 (in un-coagulated form) on an outer surface of support 20.

Located vertically below annular die 34 is coagulation bath 60, containing non-solvent 62. Hollow fiber support 20 exits annular die 34 with un-coagulated polymer coating 50 present at the outer porous surface of hollow fiber support 20. To cause the dissolved polymer of polymer coating 50 to coagulate and form a filter layer (thin porous coating layer) 64 on the outer surface of hollow fiber support 20, the hollow fiber support 20 with un-coagulated polymer coating 50 next contacts non-solvent 62 of coagulation bath 60. Non-solvent 62 contacts polymer coating 50 and interacts with the solvent and dissolved filter layer polymer of polymer coating 50 to cause the dissolved filter polymer to precipitate out of solution (e.g., coagulate) to form a layer of filter polymer on the outer surface of support 20. The result is composite hollow fiber 70 made of support 20, with filter layer 64 (un-dried, as illustrated) coated on an outer porous surface thereof.

Optionally, and as illustrated, support 20 with un-coagulated polymer coating 50 passes through air-gap 52 after exiting annular die 34 and before contacting non-solvent 62 of coagulation bath 60. Upon entering coagulation bath 60, non-solvent 62 causes polymer solution 50 to phase separate and form porous coating layer (filter layer) 64 composite hollow fiber 70. In other example embodiments, no air-gap is present between annular die 34 and non-solvent 62, and the phase separation occurs inside the coagulation bath immediately polymer coating 50 (on support 20) exists annular die 34.

In some examples of the coating method, the polymer solution (as polymer coating 50) at least partially penetrates into pores of the outer porous surface of the hollow fiber support 20. Upon coagulation of the filter polymer of polymer coating 50, mechanical interlocking occurs between the coated (coagulated) filter layer 64 and the outer porous surface of the hollow fiber support 20. In some embodiments, the degree (depth) of penetration of polymer solution 30 into hollow fiber support 20 at the outer porous surface is sufficiently small so that the fluid transport resistance through composite 70 remains sufficiently low to allow composite 70 to function as a useful filter membrane.

As one or more optional subsequent steps, a washing tank, heating step, drying step, annealing step, godet rolls, or winding section, may be used to further handle or process composite 70. For example, after the phase separation (coagulation) step, composite hollow fiber 70 can be guided through a washing tank to extract residual solvent. Subsequently, the washed (still wet) composite may be collected on a roll, optionally before or after a post-processing annealing or drying step.

A composite filter membrane as described can be useful to remove one or more contaminants from a liquid by passing the liquid through the filter membrane to produce a filtered (or "purified") liquid (sometimes referred to as a "permeate"). The filtered liquid will contain a reduced level of a contaminant compared to a level of the contaminant present in the liquid before the liquid is passed through the composite filter membrane. As desired to maintain the placement of the filter layer on an outer surface of the support, liquid can be flowed in a direction of flow from the outside surface to the inner hollow opening of the composite; i.e., liquid may be passed from an exterior of the hollow composite, first through the filter layer at an outside surface of the composite, next through the hollow fiber support, and then enter and flow along the hollow interior of the composite.

A composite as described can provide a useful, desirable, or advantageous combination of physical properties, including performance (filtering performance as measured by "retention"), pore size or bubble point (related to pore size), flow, and mechanical properties (flexibility and durability or reduced fragility).

A level of effectiveness of a composite filter membrane in removing unwanted material (i.e., "contaminants") from a liquid can be measured, in one fashion, as "retention." Retention, with reference to the effectiveness of a filter membrane (e.g., a composite filter membrane as described), generally refers to a total amount of an impurity (actual or during a performance test) that is removed from a liquid that contains the impurity, relative to the total amount of the impurity that was in the liquid upon passing the liquid through the filter membrane. The "retention" value of a filter membrane is, thus, a percentage, with a filter that has a higher retention value (a higher percentage) being relatively more effective in removing particles from a liquid, and a filter that has a lower retention value (a lower percentage) being relatively less effective in removing particles from a liquid.

Particle retention can be measured as by measuring the number of test particles removed from a fluid stream by a membrane placed in the fluid stream. By one method, particle retention can be measured by passing a sufficient amount of an aqueous feed solution of 0.1% Triton X-100, containing 8 ppm polystyrene particles having a nominal diameter of 0.03 microns (available from Duke Scientific G25B), to achieve 1% monolayer coverage through the membrane at a constant flow of 7 milliliters per minute, and collecting the permeate. The concentration of the polystyrene particles in the permeate can be calculated from the absorbance of the permeate. Particle retention is then calculated using the following equation:

$$\text{particle retention} = \frac{[\text{feed}] - [\text{filtrate}]}{[\text{feed}]} \times 100\%.$$

"Nominal diameter," as used herein, is the diameter of a particle as determined by photon correlation spectroscopy (PCS), laser diffraction or optical microscopy. Typically, the calculated diameter, or nominal diameter, is expressed as the diameter of a sphere that has the same projected area as the projected image of the particle. PCS, laser diffraction and optical microscopy techniques are well-known in the art. See, for example, Jillavenkatesa, A., et al.; "Particle Size Characterization;" NIST Recommended Practice Guide; National Institute of Standards and Technology Special Publication 960-1; January 2001.

In preferred embodiments of composite membranes as described, a composite membrane can exhibit a retention that exceeds 90 percent for monolayers coverages of 0.5%, 1.0%, 1.5%, and 2.0%, and may also exceed 95 percent for monolayers coverages of 0.5% and 1.0%. With this level of retention, these examples of the inventive composite membranes exhibit a higher retention level as compared to many currently commercial filter membranes, such as comparable flat sheet and hollow fiber filter membranes made of UPE. These example composite membranes also allow for useful, good, or very good rates of flow (low flow time), and exhibit mechanical properties that allow the composite membranes to be prepared and assembled into a filter cartridge or filter product.

Bubble point is an understood property of a porous material, including of a composite filter membrane as described. Bubble point can correspond to pore size, which may correspond to filtering performance. A smaller pore size can be correlated to a higher bubble point and possibly to higher filtering performance (higher retention). Normally, however, a higher bubble point also correlates with relatively higher resistance of flow through a porous material, and a lower flux. According to certain preferred embodiments, a composite filter membrane can exhibit a combination of a relatively higher bubble point, good filtering performance, yet still exhibit a good or advantageous flow (relatively high flow rate, or relatively high flux), e.g., a flux that may be associated with a much lower bubble point in other hollow fiber membrane designs or compositions.

By one method of determining the bubble point of a porous material, a sample of the porous material is immersed in and wetted with a liquid having a known surface tension, and a gas pressure is applied to one side of the sample. The gas pressure is gradually increased. The minimum pressure at which the gas flows through the sample is called a bubble point. Examples of useful bubble points of a porous filter membrane as described, measured using ethoxy-nonafluorobutane (HFE 7200) from Novec, IPA, or water, compressed air or compressed $N_2$ gas, at a temperature of from 20 to 30 (normally 25) degrees Celsius, can be in a range from 2 to 500 psi, e.g., from 50 to 500 psi, from 2 to 400 psi, or from 135 to 185 psi.

In combination with a desired bubble point and filtering performance (e.g., measured by retention) a composite membrane as described can exhibit a useful or advantageously low resistance of flow of liquid through the composite membrane. A resistance to liquid flow can be measured in terms of flux. A composite membrane as described can preferably have a relatively high flux, preferably in combination with a bubble point that is relatively high and good filtering performance. An example of a useful or preferred flux can be at least 10 LMH/bar (liters per square meter per hour), e.g., at least 20 LMH/bar, or at least 30 LMH/bar or in a range from 20 to 8000 LMH/bar.

A filter membrane as described herein, or a filter or filter component that contains a composite hollow fiber filter membrane as described, can be useful in a method of filtering a liquid chemical material to purify or remove unwanted materials from the liquid chemical material, especially to produce a highly pure liquid chemical material that is useful for an industrial process that requires chemical material input that has a very high level of purity. Generally, the liquid chemical may be of any of various useful commercial materials, and may be a liquid chemical that is useful or used in any application, for any industrial or commercial use. Particular examples of filters as described can be used to purifying a liquid chemical that is used or useful in a semiconductor or microelectronic fabrication application, e.g., for filtering a liquid solvent or other process liquid used in a method of semiconductor photolithography. Some specific, non-limiting, examples of solvents that can be filtered using a filter membrane as described include: n-butyl acetate (nBA), isopropyl alcohol (IPA), 2-ethoxyethyl acetate (2EEA), a xylene, cyclohexanone, ethyl lactate, methyl isobutyl carbinol (MIBC), methyl isobutyl ketone (MIBK), isoamyl acetate, undecane, propylene glycol methyl ether (PGME), propylene glycol monomethyl ether acetate (PGMEA), or a mixture of any of these, such as mixture of PGME and PGMEA The composite membrane can be contained within a larger filter structure such as a filter or a filter cartridge that is used in a filtering system. The filtering system will place the composite filter membrane, e.g., as part of a filter or filter cartridge, in a flow path of a liquid chemical to cause at least a portion of the flow of the liquid chemical to pass through the filter layer of the composite filter membrane, so that the filter layer removes an amount of the impurities or contaminants from the liquid chemical. The structure of a filter or filter cartridge may include one or more of various additional materials and structures that support the composite filter membrane within the filter to cause fluid to flow from a filter inlet, through the composite membrane (including the filter layer), and thorough a filter outlet, thereby passing through the composite filter membrane when passing through the filter.

Figure 2:
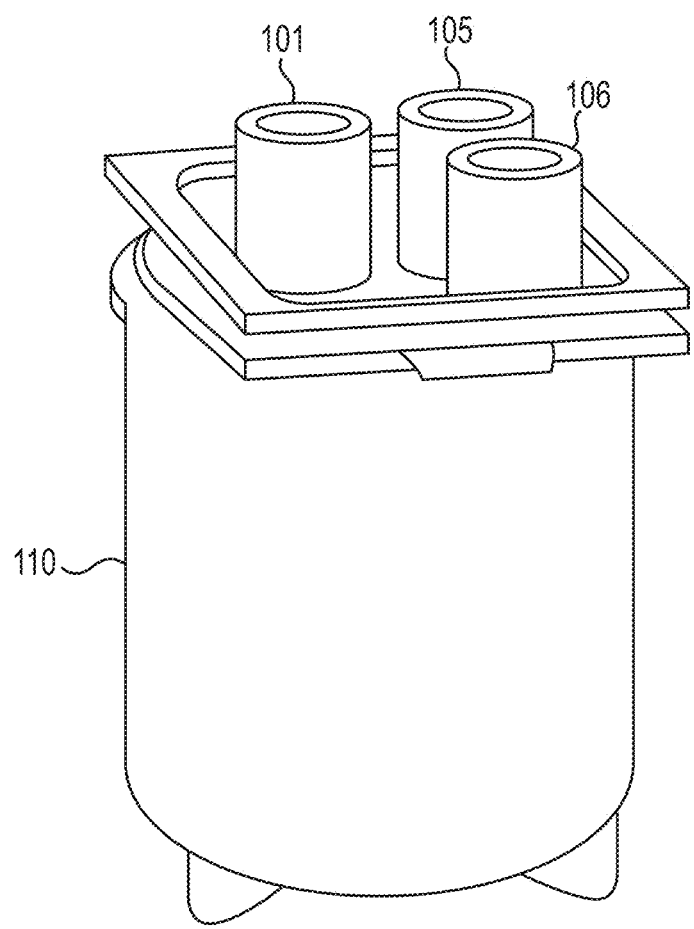
FIGS. 2 and 3 show example embodiments of filter and components of a filter that include a composite hollow fiber filter membrane of the description.
Figure 3:
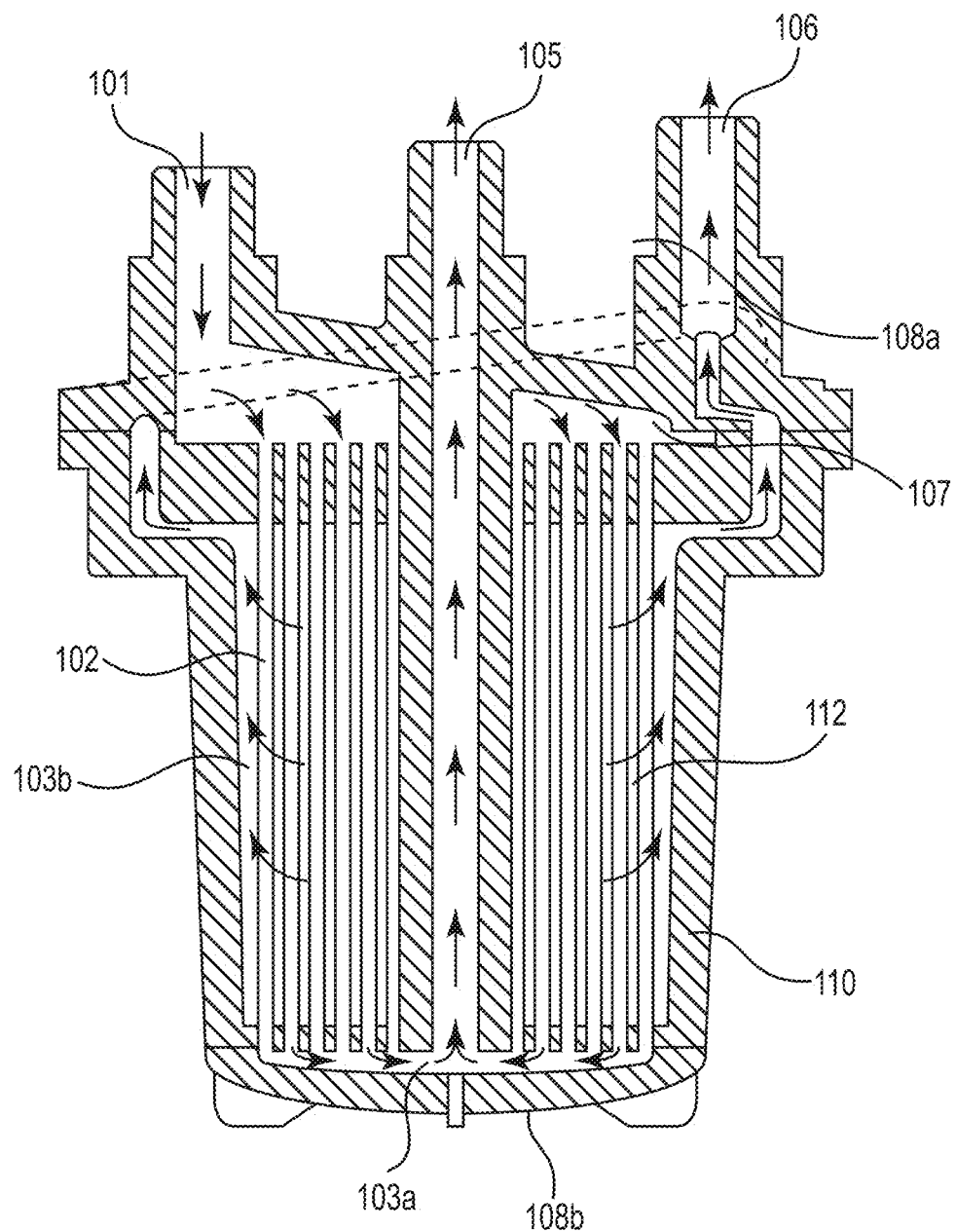

Examples of useful filters and method for assembling the filters are described in International Patent Application Publication Number WO 2017/007683, the entirety of which is incorporated herein by reference. FIGS. 2 and 3 show examples of these filters.

FIGS. 2 and 3 illustrate an example of a fluid separation device or filter that includes a composite filter membrane of the present description. FIG. 2 is an external view of a filter and FIG. 3 illustrates the composite membrane (multiple composite membranes) and the flow of liquid to be separated as the liquid enters and exits the fluid separation device. The fluid separation device (filter) includes housing 110 which comprises multiple composite membranes 112. Each membrane 112 is potted at each of two opposed both end regions to form a fluid tight seal between the end regions and an open middle region 107. Open middle region 107 is not potted and must remain open so that permeate 106 can travel through each membrane 112, as discussed below. The potted end regions do not allow liquid to pass through, and are therefore "fluid-tight."

In use, a liquid feed enters the housing at active 101, and is introduced to membranes 112 inside the housing. The membranes 112 separate the space within the housing into a first volume 103 and second volume 103b. Upon exposure of the liquid feed to the membranes 112 the permeate, which is material that passes through the membranes 112, enters the second volume 103b, and the retentate, the material that does not pass through the membrane 102, enters the first volume. The retentate can then be collected or filtered further upon extraction from the housing via connector 105. The permeate exits via a different connector 106, where is can be concentrated, disposed of, or recirculated back into the system.

In the filter embodiment of FIGS. 2 and 3, a portion of the feed liquid passes through one of the composite membranes 112 to form the permeate, and another portion of the feed liquid passes through the filter without passing through a composite membrane 112. According to other filter embodiments, the entire amount of feed liquid passes through a composite membranes 112 to form permeate, and no portion of the feed fluid by-passes the composite membranes 112 to form the retentate. See, for example, FIG. 6 of U.S. Pat. No. 5,695,702, the entire content of that patent document being incorporated herein by reference.

EXAMPLES

Example 1. Fabrication of composite Polyimide (P84)/Nylon hollow fiber. A 0.2 micron Nylon hollow fiber was used as the hollow fiber support. A polymer solution consisting of P84 polyimide/NMP/propionic acid (17/75/8 weight percent) was pumped using a syringe pump with a flow rate of 1 ml/min through the annular section of an annular die with the following dimensions: ID=1 mm, annular region gap=0.3 mm. The extrudate passed through an air-gap distance of 1 centimeter before entering a coagulation bath consisting of water. The hollow fiber support drawing speed through the die was 2 feet per minute.

Example 2. Fabrication of composite polyamide-imide (Torlon)/Nylon hollow fiber. A 0.2 micron Nylon hollow fiber was used as the hollow fiber support. A polymer solution consisting of cured Torlon @275° C./NMP/Triethylene Glycol (12/70/18 wt %) was pumped using a syringe pump with a flow rate of 1 ml/min through the annular section of an annular die with the following dimensions: ID=1 mm, annular region gap=0.3 mm. The extrudate passed through an air-gap distance of 1 centimeter before entering a coagulation bath consisting of water. The hollow fiber drawing speed through the die was 2 ft/min.

In a first aspect, a composite hollow fiber filter membrane comprises: a polymeric, microporous, hollow fiber support comprising: an outer surface, an inner surface, a thickness extending between the outer surface and the inner surface, and micropores; and a porous polymeric filter layer comprising coagulated polymer contacting the outer surface.

A second aspect according to the first aspect, wherein the filter layer includes pores having an average pore size that is smaller than an average pore size of the micropores of the hollow fiber support.

A third aspect according to the first or second aspect, wherein the hollow fiber support has an average pore size of less than 10 microns.

A fourth aspect according to the third aspect, wherein the filter layer has an average pore size in a range from 1 nanometer to 8 microns.

A fifth aspect according to any of the preceding aspects, wherein the hollow fiber support (in the absence of the filter layer) has a thickness in a range from 20 to 200 microns.

A sixth aspect according to any of the preceding aspects, wherein the hollow fiber support comprises, consists of, or consists essentially of one or a combination of polyolefin and nylon.

A seventh aspect according to any of the preceding aspects, wherein the filter layer penetrates the thickness of the hollow fiber support to a depth of not greater than 2 microns.

An eighth aspect according to any of the preceding aspects, wherein the coagulated polymer is formed by immersion precipitation of filter layer polymer on the hollow fiber support.

A ninth aspect according to any of the preceding aspects, wherein the filter layer comprises polymer that is soluble in solvent selected from the group consisting of n-methyl pyrrolidone (NMP), dimethylformamide (DMF), dimethylacetamide (DMAc), and combinations thereof.

A tenth aspect according to any of the preceding aspects, wherein the filter layer is resistant to solvent selected from the group consisting of propylene glycol methyl ether (PGME), propylene glycol methylether acetate (PGMEA), and cyclohexanone.

An eleventh aspect according to any of the preceding aspects, wherein the coagulated polymer comprises polymer selected from the group consisting of polyimide, polyamide-imide, and polyamide.

A twelfth aspect according to any of the preceding aspects, wherein the composite membrane has a flux in a range from 20 to 8000 LMH/bar and bubble point in a range from 50-500 psi measured using ethoxy-nonafluorobutane (HFE 7200) at a temperature of 25 degrees Celsius.

A thirteenth aspect according to any of the preceding aspects, wherein the porous polymeric filter layer penetrates not more than partially into the thickness of the hollow fiber support.

A fourteenth aspect according to any of the first through twelfth aspects, wherein the porous polymeric filter layer penetrates substantially into the thickness of the hollow fiber support.

A fifteenth aspect according to any of the preceding aspects, wherein the filter layer includes pores having an average pore size that is larger than an average pore size of the micropores of the hollow fiber support.

In a sixteenth aspect, a filter comprises the composite hollow fiber filter membrane of any of the first through fifteenth aspects.

In a seventeenth aspect, a method of filtering a fluid comprises: passing fluid through a filter according to the sixteenth aspect by passing the fluid in a direction of flow through the filter layer first and through the hollow fiber support second.

An eighteenth aspect according to the seventeenth aspect, wherein the fluid is a semiconductor lithography solvent.

A nineteenth aspect according to the eighteenth aspect, wherein the solvent is selected from the group consisting of propylene glycol methyl ether (PGME), propylene glycol methylether acetate (PGMEA), cyclohexanone, and n-butyl acetate.

A twentieth aspect according to the seventeenth aspect, wherein the solvent is selected from dilute or concentrated hydrofluoric acid, sulfuric acid, and a peroxide solution.

In a twenty-first aspect, includes a method of preparing a composite hollow fiber filter membrane comprising a polymeric, microporous, hollow fiber support and a porous polymeric filter layer, the method comprising: placing a polymer solution coating on an outer surface of the polymeric, microporous, hollow fiber support, the polymer solution comprising polymer dissolved in solvent, and contacting the polymer solution coating with coagulation solution to cause dissolved polymer of the polymer solution coating to form a layer of coagulated polymer on the outer surface, the layer of coagulated polymer contacting the outer surface and penetrating not more than partially into a thickness of the polymeric, microporous, hollow fiber support.

A twenty-second aspect according to the twenty-first aspect, further comprising, during placing: passing the polymeric, microporous, hollow fiber support through a central opening of an annular die, and passing the polymer solution through an annular opening of the annular die to place the polymer solution coating on the outer surface.

A twenty-third aspect according to the twenty-first aspect or the twenty-second aspect, further comprising allowing for an amount of evaporation of the polymer solution coating before contacting the polymer solution coating with the coagulation solution.

A twenty-fourth aspect according to any of the twenty-first through twenty-third aspects, wherein the coagulated polymer comprises polymer selected from the group consisting of polyimide, polyamide-imide, and polyamide.

A twenty-fifth aspect according to any of the twenty-first through twenty-fourth aspects, wherein the hollow fiber support comprises, consists of, or consists essentially of polyolefin or nylon.

The invention claimed is:

1. A composite hollow fiber filter membrane comprising:
a polymeric, microporous, hollow fiber support comprising:
an outer surface,
an inner surface,
a thickness extending between the outer surface and the inner surface, and
micropores; and
a porous polymeric filter layer that is not cured and comprises coagulated polymer precipitated onto the outer surface,
wherein the porous polymeric filter layer has a porosity in a range from 60% to 85%,
wherein the porous polymeric filter layer includes pores having an average pore size in a range from 10 nanometers to 8 microns, wherein the composite hollow fiber filter membrane exhibits a retention that exceeds 90% for monolayer coverages of 0.5%, 1.0%, 1.5%, and 2.0%, wherein the coagulated polymer is selected from the group consisting of polyimides, polyamides, polyamide-imides, and polysulfones, wherein the hollow fiber support (in the absence of the porous polymeric filter layer) has a thickness of from about 20 to 200 microns and is thicker than the porous polymeric filter layer, wherein the composite hollow fiber filter membrane is configured to filter a solvent selected from the group consisting of propylene glycol methyl ether (PGME), propylene glycol methylether acetate (PGMEA), and cyclohexanone, and wherein the porous polymeric filter layer is resistant to the solvent selected from the group consisting of propylene glycol methyl ether (PGME), propylene glycol methylether acetate (PGMEA), and cyclohexanone.

2. The composite hollow fiber filter membrane of claim 1, wherein the porous polymeric filter layer includes the pores having the average pore size that is smaller than an average pore size of the micropores of the hollow fiber support.

3. The composite hollow fiber filter membrane of claim 1, wherein the hollow fiber support has an average pore size of less than 10 microns.

4. The composite hollow fiber filter membrane of claim 1, wherein the hollow fiber support (in the absence of the porous polymeric filter layer) has a thickness in a range from 30 to 150 microns.

5. The composite hollow fiber filter membrane of claim 1, wherein the hollow fiber support comprises polyolefin or nylon.

6. The composite hollow fiber filter membrane of claim 1, wherein the porous polymeric filter layer penetrates the thickness of the hollow fiber support to a depth of not greater than 2 microns.

7. The composite hollow fiber filter membrane of claim 1, wherein the coagulated polymer is formed by immersion precipitation of filter layer polymer on the hollow fiber support.

8. The composite hollow fiber filter membrane of claim 1, wherein the porous polymeric filter layer comprises polymer that is soluble in solvent selected from the group consisting of n-methyl pyrrolidone (NMP), dimethylformamide (DMF), dimethylacetamide (DMAc), and combinations thereof.

9. The composite hollow fiber filter membrane of claim 1, wherein the coagulated polymer comprises polymer selected from the group consisting of polyimide and polyamide-imide.

10. The composite hollow fiber filter membrane of claim 1, wherein the composite membrane has a flux in a range from 20 to 8000 LMH/bar and bubble point in a range from 50-500 psi measured using ethoxy-nonafluorobutane (HFE 7200) at a temperature of 25 degrees Celsius.

11. The composite hollow fiber filter membrane of claim 1, wherein the porous polymeric filter layer penetrates partially into the thickness of the hollow fiber support.

12. The composite hollow fiber filter membrane of claim 1, wherein the porous polymeric filter layer penetrates substantially into the thickness of the hollow fiber support.

13. The composite hollow fiber filter membrane of claim 1, wherein the porous polymeric filter layer includes the pores having the average pore size that is larger than an average pore size of the micropores of the hollow fiber support.

14. A method of preparing a composite hollow fiber filter membrane comprising a polymeric, microporous, hollow fiber support and a porous polymeric filter layer, the method comprising:

placing a polymer solution coating on an outer surface of the polymeric, microporous, hollow fiber support, the polymer solution comprising a polymer selected from the group consisting of polyimides, polyamides, polyamide-imides, and polysulfones dissolved in solvent and excluding curing reagents, and contacting the polymer solution coating with coagulation solution to cause dissolved polymer of the polymer solution coating to form a layer of coagulated polymer on the outer surface, the layer of coagulated polymer precipitated onto the outer surface and penetrating partially into a thickness of the polymeric, microporous, hollow fiber support, wherein the porous polymeric filter layer has a porosity in a range from 60% to 85%, wherein the porous polymeric filter layer includes pores having an average pore size in a range from 10 nanometers to 8 microns, wherein the composite hollow fiber filter membrane exhibits a retention that exceeds 90 for monolayer coverages of 0.5%, 1.0%, 1.5%, and 2.0% %, wherein the polymeric, microporous, hollow fiber support (in the absence of the porous polymeric filter layer) has a thickness of from about 20 to 200 microns and is thicker than the porous polymeric filter layer, wherein the composite hollow fiber filter membrane is configured to filter a solvent selected from the group consisting of propylene glycol methyl ether (PGME), propylene glycol methylether acetate (PGMEA), and cyclohexanone, and wherein the porous polymeric filter layer is resistant to the solvent selected from the group consisting of propylene glycol methyl ether (PGME), propylene glycol methylether acetate (PGMEA), and cyclohexanone.

15. The method of claim 14 further comprising, during placing:

passing the polymeric, microporous, hollow fiber support through a central opening of an annular die, and passing the polymer solution through an annular opening of the annular die to place the polymer solution coating on the outer surface.

16. The method of claim 14, further comprising allowing for an amount of evaporation of the polymer solution coating before contacting the polymer solution coating with the coagulation solution.

17. The method of claim 14, wherein the coagulated polymer comprises polymer selected from the group consisting of polyimide and polyamide-imide.

18. A filter comprising a composite hollow fiber filter membrane comprising:

a polymeric, microporous, hollow fiber support comprising:
an outer surface,
an inner surface,
a thickness extending between the outer surface and the inner surface, and
micropores; and a porous polymeric filter layer that is not cured and comprises coagulated polymer precipitated onto the outer surface, wherein the porous polymeric filter layer has a porosity in a range from 60% to 85%, wherein the porous polymeric filter layer includes pores having an average pore size in a range from 10 nanometers to 8 microns,
wherein the composite hollow fiber filter membrane exhibits a retention that exceeds 90 for monolayer coverages of 0.5%, 1.0%, 1.5%, and 2.0% %,
wherein the coagulated polymer is selected from the group consisting of polyimides, polyamides, polyamide-imides, and poly sulfones,
wherein the hollow fiber support (in the absence of the porous polymeric filter layer) has a thickness of from about 20 to 200 microns and is thicker than the porous polymeric filter layer,
wherein the composite hollow fiber filter membrane is configured to filter a solvent selected from the group consisting of propylene glycol methyl ether (PGME), propylene glycol methylether acetate (PGMEA), and cyclohexanone, and
wherein the porous polymeric filter layer is resistant to the solvent selected from the group consisting of propylene glycol methyl ether (PGME), propylene glycol methylether acetate (PGMEA), and cyclohexanone.

* * * * *